Patented Feb. 2, 1954

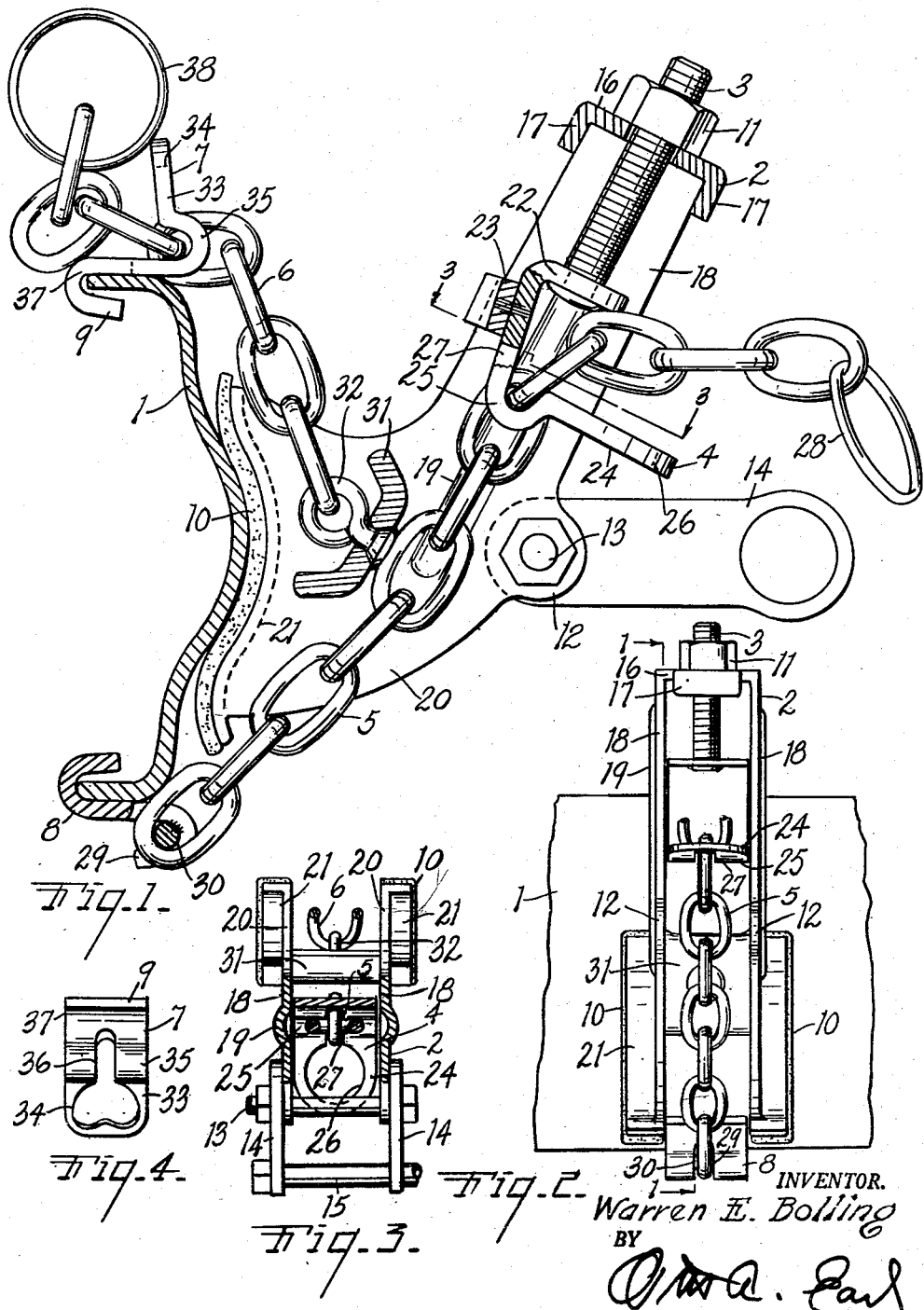

2,668,064

UNITED STATES PATENT OFFICE 2,668,064

COUPLING HEAD FOR ATTACHING TOWING DEVICES TO BUMPERS OF AUTOMOBILES

Warren E. Bolling, Spring Lake, Mich., assignor to Max Hayman, Battle Creek, Mich.

Application March 22, 1952, Serial No. 278,099

5 Claims. (Cl. 280—502)

This invention relates to improvements in a coupling head for attaching towing devices to bumpers of automobiles.

The principal objects of this invention are:

First, to provide a coupling head which is simple to construct and which employs inexpensive oval link chain as an adjustable coupling elemnt and which is at the same time rugged and well able to withstand the loads applied thereto.

Second, to provide a coupling head of simple and sturdy construction which is readily adjustable to be clamped to a bumper in various adjusted positions and to cooperate with bumpers having various cross-sectional shapes.

Third, to provide a coupling head which employs inexpensive oval link chain as attaching elements.

Fourth, to provide a coupling head which has no loose parts which may become lost.

Fifth, to provide a novel form of adjustable connection between the links of an oval link chain and the body of a coupling head and a bumper engaging hook of a coupling device Sixth, to provide a coupling head that is easily adjusted to various positions relative to a bumper and easily and securely clamped thereto in any of its adjusted positions.

Other objects and advantages of my invention will be apparent from a consideration of the following description and claims.

The drawings of which there is one sheet illustrate a preferred form of my coupling head.

Fig. 1 is a vertical longitudinal cross-sectional view through the coupling head and transversely through an automobile bumper on which the head is mounted.

Fig. 2 is an end elevational view of the coupling head viewed from the opposite side from the bumper.

Fig. 3 is a fragmentary transverse cross-sectional view through the coupling head taken along the plane of the line 3—3 in Fig. 1.

Fig. 4 is a plan view of the bumper engaging hook on the upper coupling chain.

My device is designed for use in coupling tow bars or other towing devices to the bumpers of automobiles. As is well known various towing devices are commonly used to tow one automobile behind another and it is necessary to attach the ends of the towing device to the bumpers of the two automobiles and these coupling structures are known as coupling heads. In the drawings I have illustrated a cross-sectional portion of an automobile bumper 1. This may be considered as the bumper of either a towing or towed automobile and it will be understood that the cross-sectional shape of the bumper will vary considerably with different makes and models of automobiles. My coupling head consists generally of a body 2 having an adjustable bolt 3 in the end thereof. The bolt 3 carries a first clip 4 to which the lower coupling chain 5 is adjustably attached. The body 2 further carries an upper coupling chain 6 having a second clip 7 adjustably secured thereto. The lower chain 5 carries a lower hook 8 permanently secured to its lower end and the second clip 7 has an upper hook 9 integrally formed thereon for engagement with the upper edge of the bumper. The lower end of the body 2 is placed laterally and provided with cushioning pads 10 adapted to seat against the surface of the bumper.

Generally the coupling head is adjusted and clamped to the particular bumper involved by adjusting the second clip 7 to proper length of the upper chain 6 to suspend the body 2 in a convenient position along the surface of the bumper. The lower hook 8 and chain 5 are then engaged with the lower edge of the bumper and drawn adjustably through the first clip 4 to provide a snug connection to the bumper. The adjusting nut 11 on the upper end of the bolt 3 is then tightened to draw the lower coupling chain 5 tight. Tightening of the lower chain 5 simultaneously draws the body 2 downwardly and tightens the upper chain 6. The lower end of the body 2 is provided with means in the form of ears 12 and a bolt 13 for attaching links 14 to the body of the coupling head. The links 14 may connect to a transversely extending draft bar or rod 15 or to other types of tow bar structures.

Considering the construction of the body 2 in greater detail it is pointed out that the body consists of a U-shaped stamping of relatively heavy sheet metal.

The end cross piece 16 of the body is downwardly flanged as at 17 for strength and is pierced centrally to freely pass the bolt 3. The side branches 18 of the U-shaped body are generally parallel and are desirably provided with strengthening ribs 19 as is most clearly illustrated in Fig. 3. At their lower ends the two side branches 18 of the U-shaped body are turned laterally in generally parallel leg portions 20 that extend at an angle to the branches and at an angle with respect to a plane passed transversely through the branches 18 of the body. The ends of the leg portions 20 are turned transversely in flanges 21 which form feet adapted to back-up the previously described pads 10 that bear against the surface of the bumper. Desirably the ends of the leg portions 20 and the flanges 21 are given a concavo-convex curvature or conformation so as to provide better seating engagement with a wide variety of bumper contours.

The upper clip 4 which is positioned between the side branches 18 of the body consists of a generally U-shaped metal stamping of relatively heavy cross-section. The upper arm 22 of the clip is securely riveted to the inner end of the bolt 3 and the clip is freely slidable between the branches of the U-shaped body when moved by the bolt 3. The base of the U-shaped clip 4 carries a cross plate 23 that extends into overlapping sliding engagement with the edges of the two branches 18 of the body and thus prevents the clip and bolt from tilting away from the feet 21 on the lower end of the body. The lower arm 24 of the clip 4 is downwardly curved in a transversely extending portion to form a U-shaped seat 25 adapted to receive the thickness of a selected one of the lengths of the lower coupling chain 5. The lower arm 24 is extended oppositely from the feet 19 and apertured as at 26 (see Fig. 3) to pass the chain 5. The slot 27 extends from the inner edge of the aperture 26 through the curved seat 25 and is of such a width as to receive the transverse thickness of a link of the chain while permitting the adjacent upper link to rest upon the seat 25. The aperture 26 is of such a diameter as to freely pass the minor diameter of the oval links of the chain 5 so that the chain is easily adjusted through the clip to bring the selected link into engagement with the seat 25. A ring 28 is looped through the end link of the chain 5 and is of larger diameter than the aperture 26 so that the upper end of the chain cannot slip through the clip 4.

The hook 8 at the bottom of the chain 5 is a simple S-shaped stamping having a slot 29 cut in one end thereof to receive the end link of the chain. A cross rod 30 is welded to the hook and extends through the lower link of the chain to permanently connect the hook to the chain. The upper chain 6 is attached to the body 2 by means of a cross member 31 that extends transversely between the leg portions 20 of the body and which is securely fastened thereto as by welding. The cross member 31 is desirably angled for strength as illustrated and is disposed forwardly of the general line of the lower chain 5 as the chain extends from the clip 4 to the hook 8 at the lower edge of the bumper. An eye bolt 32 is swivelly mounted in the center of the cross member 31 with its eye portion facing the feet 21 on the body. The lower link of the upper chain 6 is looped through the eye bolt 32.

The upper clip 7 consists of an angle shaped stamping having one arm 33 provided with an aperture 34 for passing the upper chain 6. At its inner end the arm 33 is laterally and transversely offset to form a seat 35 for the selected length of the chain 6 and a slot 36 opens from the aperture through the seat 35 in much the same fashion as the slot 27 in the clip 4. The other arm 37 of the upper clip is reversely bent to form the hook 9 as previously described. The upper end of the upper chain 6 is provided with a ring 38 that is larger in diameter than the aperture 34 so that the upper clip 7 cannot become lost from the upper chain 6.

It is pointed out that all of the stresses raised in the coupling head by the clamping action thereof on the bumper and by the transmission of towing forces therethrough are accommodated by straight tension forces in the links of the chains and the several elements of the coupling head. The elements of the head are well adapted to withstand and accommodate these tension stresses.

Having thus described my invention, what I claim as new and desire to secure by Letters Patent is:

1. A coupling head for attachment to the bumper of a vehicle comprising a U-shaped folded sheet metal body having generally parallel integral leg portions on the free ends of the branches thereof and extending at an angle from a plane passed transversely through the branches of said body, transversely turned integral feet on the ends of said leg portions, said feet and the ends of said leg portions having a concavo-convex conformation relative to said plane and being adapted to abut the surface of a bumper, the end cross piece of said body having a flat central portion with a hole formed therein, a bolt passed through said hole and having a nut on its outer end bearing against said flat central portion, a U-shaped folded sheet metal clip disposed between the branches of said body and opening oppositely from said legs, said clip having arms disposed normally to said branches with the upper arm fixedly secured to the inner end of said bolt for sliding motion between said branches, the lower arm of said clip having a downwardly offset transversely extending seat formed therein adjacent the base of the clip, said lower arm of said clip having an aperture formed therein with an enlarged portion at the outer end of the arm and a narrow slot like portion extending through said seat, a first chain passed through said aperture and having links of minor diameter capable of passing through the enlarged portion of said aperture and of a thickness slightly less than the width of said slot, a ring on the upper end of said chain of larger diameter than said aperture, a hook fixedly secured to the lower end of said chain, a cross plate fixedly connected to the case of said clip and extending into lapped sliding engagement with the edges of the branches of said body opposite from the arms of said clip, a cross member fixedly connected between said leg portions adjacent their junction with the branches of said body and below said clip, an eye element swivelly connected to said cross member and extending toward said feet, a second chain having one end secured to said eye element, a second clip having angled arms with a transversely extending U-shaped seat formed near the junction thereof, one arm of said second clip having an opening formed therein with an enlarged portion receiving and passing the links of said second chain at their minor diameter and having a narrow slot extension into the seat of said second clip adapted to receive a link edgewise, a hook turned from the end of the other arm of said second clip oppositely from said one arm thereof, a ring on the other end of said second chain of larger diameter than the opening in said second clip, and means on the branches of said body and adjacent the opposite edges thereof from said leg portions for attaching said body to a towing element.

2. A coupling head for attachment to the bumper of a vehicle comprising, a U-shaped body having generally parallel integral leg portions on the free ends of the branches thereof and extending at an angle from a plane passed transversely through the branches of said body, transversely turned feet on the ends of said leg portions, said feet and the ends of said leg portions having a concavo-convex conformation relative to said plane and being adapted to abut the surface of a bumper, the end cross piece of said body having a flat central portion with a hole formed therein, a bolt passed through said hole and having a nut on its outer end bearing against said flat central portion, a U-shaped clip disposed between the branches of said body and opening oppositely from said legs, said clip having arms disposed normally to said branches with the upper arm secured to the inner end of said bolt for sliding motion between said branches, the lower arm of said clip having a downwardly offset transversely extending seat formed therein adjacent the base of the clip, said lower arm of said clip having an aperture formed therein with an enlarged portion at the outer end of the arm and a narrow slot like portion extending through said seat, a first chain passed through said aperture and having links of minor diameter capable of passing through the enlarged portion of said aperture and of a thickness slightly less than the width of said slot, a ring on the upper end of said chain of larger diameter than said aperture, a hook fixedly secured to the lower end of said chain, a cross member fixedly connected between said leg portions and below said clip, an eye element swively connected to said cross member and extending toward said feet, a second chain having one end secured to said eye element, a second clip having angled arms with a transversely extending U-shaped seat formed near the junction thereof, one arm of said second clip having an opening formed therein with an enlarged portion receiving and passing the links of said second chain at their minor diameter and having a narrow slot extension into the seat of said second clip adapted to receive a link edgewise, a hook turned from the end of the other arm of said second clip oppositely from said one arm thereof, a ring on the other end of said second chain of larger diameter than the opening in said second clip, and means on the branches of said body for attaching said body to a towing element.

3. A coupling head for attachment to the bumper of a vehicle comprising, a U-shaped body having generally parallel integral leg portions on the free ends of the branches thereof and extending at an angle from a plane passed transversely through the branches of said body, transversely extending feet on the ends of said leg portions, said feet and the ends of said leg portions having a conformation adapted to abut the surface of a bumper, the end cross piece of said body having a hole formed therein, a bolt passed through said hole and having a nut on its outer end bearing against said cross piece, a U-shaped clip disposed between the branches of said body and opening oppositely from said leg portions, said clip having arms disposed normally to said branches with the upper arm fixedly secured to the inner end of said bolt for sliding motion between said branches, the lower arm of said clip having a downwardly offset transversely extending seat formed therein adjacent the base of the clip, said lower arm of said clip having an aperture formed therein with an enlarged portion at the outer end of the arm and a narrow slot-like portion extending through said seat, a first chain passed through said aperture and having links of minor diameter capable of passing through the enlarged portion of said aperture and of a thickness slightly less than the width of said slot, a ring on the upper end of said chain of larger diameter than said aperture, a hook fixedly secured to the lower end of said chain, a cross member fixedly connected between the branches of said body and below said clip, an eye element swively connected to said cross member and extending toward said feet, a second chain having one end secured to said eye element, a second clip having angled arms with a transversely extending U-shaped seat formed near the junction thereof, one arm of said second clip having an opening formed therein with an enlarged portion receiving and passing the links of said second chain at their minor diameter and having a narrow slot extension into the seat of said second clip adapted to receive a link edgewise, a hook on the end of the other arm of said second clip extending oppositely from said one arm thereof, a ring on the other end of said second chain of larger diameter than the opening in said second clip, and means on the branches of said body for attaching said body to a towing element.

4. A coupling head for attachment to the bumper of a vehicle comprising, a U-shaped body having generally parallel integral leg portions on the free ends of the branches thereof, feet on the ends of said branches, said feet having a concavo-convex conformation adapted to abut the surface of a bumper, the end cross piece of said body having a hole formed therein, a bolt passed through said hole and having a nut on its outer end bearing against said cross piece, a U-shaped clip disposed between the branches of said body and opening oppositely from said legs, said clip having arms disposed transversely to said branches with the upper arm secured to the inner end of said bolt for sliding motion between said branches, the lower arm of said clip having a downwardly offset transversely extending seat formed therein adjacent the base of the clip, said lower arm of said clip having an aperture formed therein with an enlarged portion at the outer end of the arm and a narrow slot-like portion extending through said seat, a first chain passed through said aperture and having links of minor diameter capable of passing through the enlarged portion of said aperture and of a thickness slightly less than the width of said slot, a hook fixedly secured to the lower end of said chain, a cross member fixedly connected between said leg portions and below said clip, an eye element swively connected to said cross member and extending toward said feet, a second chain having one end secured to said eye element, a second clip having a transversely extending U-shaped seat formed thereon, said second clip having an opening formed therein with an enlarged portion receiving and passing the links of said second chain at their minor diameter and having a narrow slot extension into the seat of said second clip adapted to receive a link edgewise, a hook turned from said second clip oppositely from the seat thereon, and means on said body for attaching said body to a towing element.

5. A coupling head for attachment to the bumper of a vehicle comprising, a chambered body having feet on one end thereof, said feet having a concavo-convex conformation adapted to abut the surface of a bumper, the other end of said body having a hole formed therein, a bolt passed through said hole and having a nut on its outer end, a clip disposed between the sides of said body, said clip having one end secured to the inner end of said bolt for sliding motion between the sides of said body, the other end of said clip having a downwardly offset transversely extending seat formed therein, said clip having an aperture formed therein with an enlarged portion and a narrow slot-like portion extending through said seat, a first chain passed through said aperture and having links of minor diameter capable of passing through the enlarged portion of said aperture and of a thickness slightly less than the width of said slot, a hook fixedly secured to the lower end of said chain, a second chain having one end swivelly secured to said body, a second clip having a transversely extending U-shaped seat formed thereon, said second clip having an opening formed therein with an enlarged portion receiving and passing the links of said second chain at their minor diameter and having a narrow slot extension into the seat of said second clip adapted to receive a link edgewise, a hook turned from the end of said second clip, and means for attaching said body to a towing element.

WARREN E. BOLLING.

References Cited in the file of this patent

UNITED STATES PATENTS

| Number | Name | Date |
| --- | --- | --- |
| 2,306,007 | Thorp | Dec. 22, 1942 |
| 2,338,934 | Gross | Jan. 11, 1944 |
| 2,474,078 | Wilcox | June 21, 1949 |
| 2,488,415 | Klein | Nov. 15, 1949 |